United States Patent [19]

Warren et al.

[11] Patent Number: 4,877,404

[45] Date of Patent: Oct. 31, 1989

[54] GRAPHICAL INTERACTIVE SOFTWARE SYSTEM

[75] Inventors: Bruce A. Warren; Dana L. Webb, both of Lake Jackson, Tex.

[73] Assignee: Warren-Forthought, Inc., Angleton, Tex.

[21] Appl. No.: 140,404

[22] Filed: Jan. 4, 1988

[51] Int. Cl.4 ............................................. G09B 19/00
[52] U.S. Cl. ................................................... 434/118
[58] Field of Search ........................................ 434/118

[56] References Cited

U.S. PATENT DOCUMENTS

| | | | |
|---|---|---|---|
| 4,131,883 | 12/1978 | Lundstrum | 340/324 AD |
| 4,392,130 | 7/1983 | Lundstrum et al. | 340/747 |
| 4,445,115 | 4/1984 | Rudgard | 340/745 |
| 4,622,013 | 11/1986 | Cerchio | 434/118 |
| 4,637,797 | 1/1987 | Whitney et al. | 434/118 |
| 4,772,206 | 9/1988 | Kerr et al. | 434/118 |

*Primary Examiner*—Leo P. Picard
*Attorney, Agent, or Firm*—Gunn, Lee & Miller

[57] ABSTRACT

A graphical interactive software training system as disclosed comprising a host computer sub-system operatively connected to a graphic computer sub-system providing training courses for use by a human operator. The training system functions without reference to a control program. It includes a series of stand-alone and isolated pictures having command functions embedded thereon requiring an interactive dialogue with the human operator to progress through the training course.

15 Claims, 2 Drawing Sheets

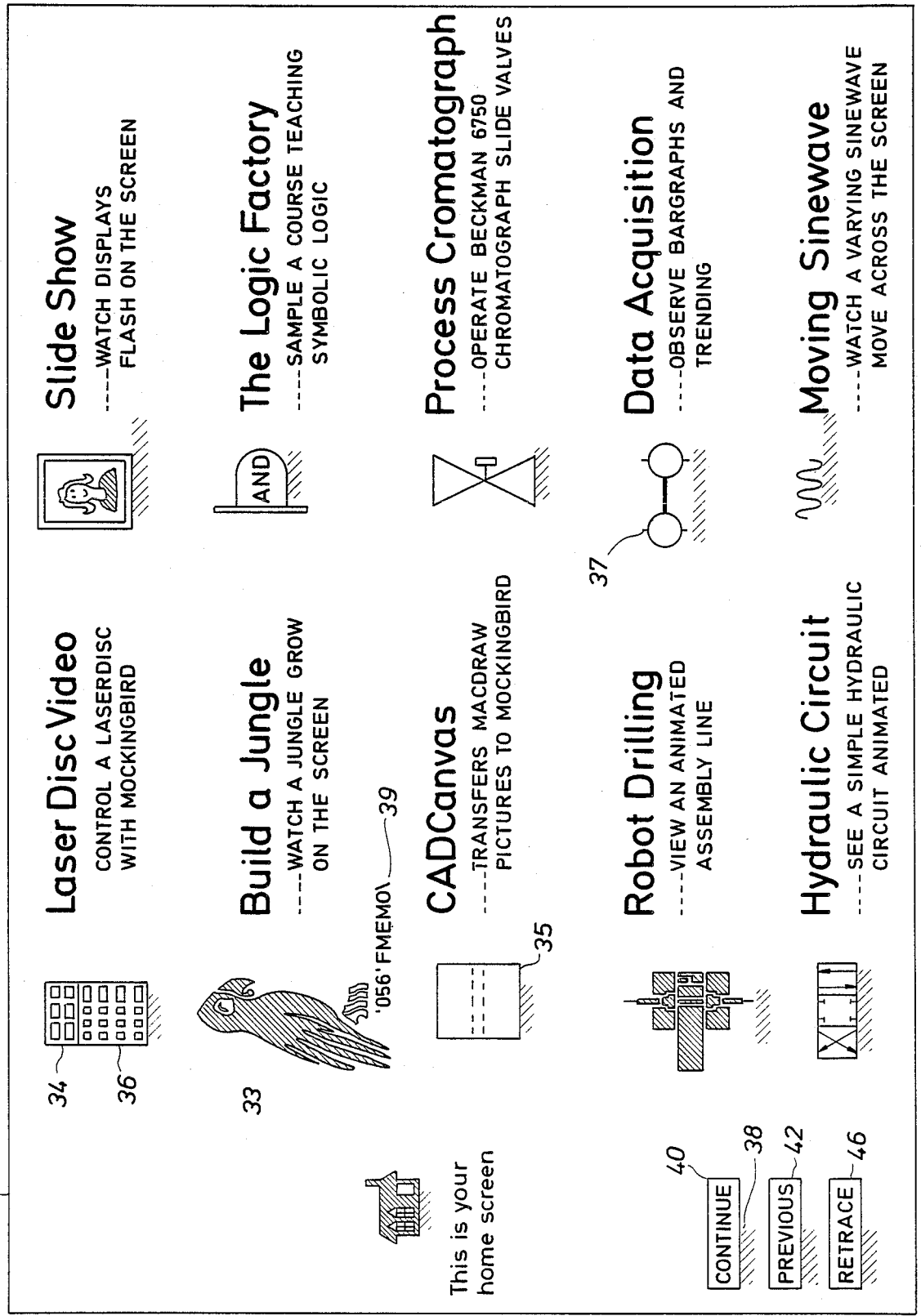

GRAPHICAL INTERACTIVE SOFTWARE SYSTEM

BACKGROUND OF DISCLOSURE

The present invention is directed to a computer system, particularly, an interactive software training system permitting dialog with a human operator through the use of a CRT display.

Generally, prior art software training systems and interactive computer programs are created by an authoring system. That is, the authoring system generates a control program that is saved in a form unalterable during the use of the program and produces a set of screens or pictures that are stored in a form unalterable during the use of the program. The control program controls the order of presentation of screens or pictures to the user on a CRT, the flow of the training, and the responses of the computer to the user inputs. The screens, which may display both textual and pictorial data, are usually stored on a disk. In some cases, the screens are created on-the-fly by the control program or produced by another computer program that is linked with the training program. This arrangement is common to computer programs of all types that interface with a human operator.

The prior art software training systems have a number of disadvantages which may be categorized into two groups, both of which are solved by the present invention. A major disadvantage of the prior art systems is that the creation of a complete course requires producing a complex computer program that will anticipate all the possible inputs of a human operator and have a useful response to everyone of them. This is almost always too expensive for a profitable product and many useful response paths are intentionally frozen out, thereby resulting in a less effective training course. Another major disadvantage is that the control programs of prior art systems have no inherent visual linkage to the pictures displayed on the CRT during the development phase of the course program. References to pictures are embedded in the control program along with all the other programming codes necessary to create a functional course. This abstract relationship between the control program and the pictures means that it is easy for the two to get out of synchronization during the development phase of the program. This may result in "bugs" in the program that are difficult to cure. In addition, deletion or modification of one picture has a ripple effect through the entire program requiring complete retesting to insure program integrity.

The present invention inverts the normal construction of a course. Where prior art systems embed picture references into a control program, thus, producing a large executable file containing thousands of programming language command lines, the present invention embeds the control commands necessary to run the course into the graphic pictures the author and operator see. These control commands are called microscripts and may be visible or invisible graphical elements of the complete picture presented to the human operator. The microscripts may be rendered visible and readable to the author of the program by using the transcriber function of the operating system of the invention.

During the development of the course, the author sees exactly the same view of the course, that is, the pictures displayed on the CRT, that the ultimate user will see. The author does not look at a special editor displaying lines of programming code. A course produced by the present invention typically consists of several hundred picture files stored on a disk as individual ASCII coded files. These ASCII coded files can be stored on any medium or any computer that can handle ASCII files. A course or data base produced by the present invention does not have "object code" or "executable code" as is common with prior art computer systems.

While the following discussion of the invention is directed to the creation and display of pictures by the program of the inventions, it is understood that the term "picture" is utilized in a broad sense to describe what is seen by the user or trainee on the CRT screen. The "picture" may include both graphic and textual elements.

The present invention combines the graphical elements in a picture that permit the human operator to see useful information with the graphical elements in a picture that enable the projector function of the operating system of the invention to see the information. The combination of graphic elements including microscript code, is interpreted or read by the operating system in a step by step fashion as the operator makes menu selections or other input choices. In its stored format, each picture of a course developed according to the present invention is totally self-contained and is not affected by changes to any other picture. Each picture is totally isolated from any other picture. Microscript code is embedded on each picture. The microscript may be embedded anywhere in the pixel pattern of the screen. Change in location or multiple locations of the microscript has no affect on the actions precipitated when the microscript code is executed. Each picture may contain hundreds of microscripts. A microscript that is tested and proven to have a useful function can be copied and placed onto any picture any number of times and will always perform exactly the same function where ever and whenever it is selected by the operator and subsequently executed by the operating system.

Prior art systems include means for displaying instructions for the author to see. However, such instructions are temporarily retrieved from some location in memory and are not stored with the other graphical elements of the picture in an inseparable form, as is the case with the present invention. The utilization of microscripts permit each picture to be isolated and independent of each other. In theory, this technique of program module isolation can be implemented in many standard programming languages. In reality, however, complete isolation of modules or procedures is not useful because a subroutine by itself is useless, being only text viewable only with a special editor. The present invention overcomes this disadvantage by providing a technique whereby each picture of a course or data base is isolated and embedded with command functions which may be executed and not linked or dependent on any other command functions embedded on the picture or any other picture in the program. Each picture can be viewed, and is in fact, always being viewed as the picture is created.

The invention of the present disclosure also enables a course to be created that re-writes itself as the operator progresses through the course. Prior art systems can not do this. A course that re-writes itself is different from and potentially more powerful than, a course that intelligently branches based on an analysis of operator input and choices. A course that intelligently branches is often called an expert system. An expert system is just a well written program. It may be a powerful program, but it is always the same program with the same algorithms. A course that rewrites itself, as described herein, is actively changing itself as the human operator progresses through the course. When the course is over, it is different from when it started. Ideally, these changes will be beneficial to the performance of the course. A course or program that re-writes itself must use the same tools on itself that its original human creator used. This is true of the present invention. While the course is running, the operating system writes a microscript code onto the visible pictures just as the original author did. This is a visible process. The user can see the microscript being rewritten on the screen. This ability may be used for many purposes. For example, the program's ability to re-write itself can be used to enable the user to reverse or retrace his path at any time. Path tracking is accomplished by the operating system of the present disclosure by embedding the number of the previous picture accessed by the operator of the course in a specified location on the displayed picture and then replacing the stored version of the current picture with the "re-written" picture. The original picture, as created on that copy of the disk by the author of the program, is gone forever. The newly stored version of the picture has a button labeled RETRACE or a similar notation, that causes the operating system written microscript to be executed by the operating system when the RETRACE button is selected by the user. Selection of the RETRACE button results in the presentation on the CRT screen of the previous picture which was accessed by the operator. This method of re-writing the control codes for the course by automatically embedding micro-script code in the picture displayed on the CRT screen is not limited simply to the above described function. Any number of creative functions to tailor the course to the particular needs of the user may be implemented by causing the operating system to automatically write microscript code on to a screen. Prior art programs can accomplish path tracking, but only by storing the path in a volatile array in memory. The stored path may be lost, however, if the course is interrupted by a memory error, loss of power, system crash, etc. The present invention stores the revised picture on disk as the new picture is being viewed by the user so that path tracking is always available.

Prior art attempts at writing a computer program that re-writes itself generally stumble on the problem of debugging. If the original program has a bug, a very common occurrence in computer programming, it becomes practically impossible to find the original bug because, at the point where the effect of the bug appears, the program has re-written itself into a different program and he code that generated the bug no longer exists. The present disclosure however, does not encounter this problem because each picture is isolated or stands alone as described above, and each picture is stored after it is re-written and can be viewed and tested as a distinct entity at any stage of its evolution.

A course created by the present invention is a collection of pictures having microscript codes embedded therein. It is therefore, an object of the present invention to provide a computer system that functions without reference to a control program to create an interactive training course. The computer system may be used for any purpose that requires an interactive dialogue with the user via the use of a CRT display.

It is another object of the invention to provide a computer system whereby picture screens are created which stand alone or are isolated from any other picture screen. Each picture is totally self-contained and cannot be affected by changes to any other picture.

It is yet another object of the invention to provide a computer system which re-writes its applications as the user progresses through the application created by the system.

It is yet another object of the invention to provide computer system wherein control commands necessary to operate the course are embedded in the graphic picture. The control commands may be visible or invisible graphical elements of the complete picture.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 2 is a sample screen produced by the computer system of the present invention.

DETAILED DESCRIPTION OF THE PREFERRED EMBODIMENT

Figure 1:
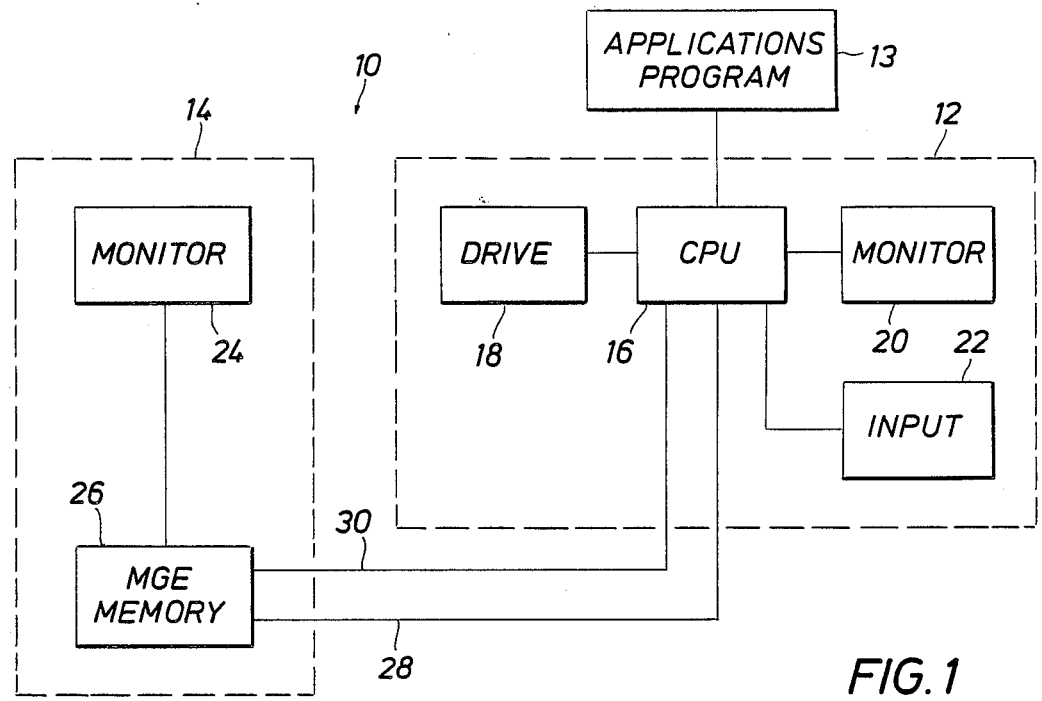
FIG. 1 is a block diagram of a system in accordance with the present invention.

Referring first to FIG. 1, the computer system of the present disclosure is generally identified by the reference numeral 10. The computer system includes a host sub-system 12 and a graphics sub-system 14. The host sub-system 12 is a standard computer system, such as a Macintosh Plus computer, including a CPU 16, disk drive 18, monitor 20 and input device 22. The host system 12 just described is preferably a Macintosh Plus system manufactured and distributed by Apple Computer, Inc. The monitor 20 is a standard CRT monitor and the input device 22 is a keyboard or a mouse. The CPU 16 is a microcomputer system including a CPU (central processing unit), disk drive, etc., to complete the system.

The applications program 13 is stored on a diskette. The diskette is inserted in the disk drive 18 of the host subsystem 12 and the program of the invention is loaded for the user.

The graphics sub-system 14 includes a high resolution color graphic monitor 24 and memory component 26. The host subsystem 12 is connected to the graphic sub-system 14 by cables 28 and 30. The memory 26 is a standard computer sub-system having enhanced graphic capabilities including a multi-processor CPU with special graphics memory. The memory 26 may be connected to multiple monitors 24 if desired. In the preferred embodiment a Tesselator system manufactured by ASEA is utilized in conjunction with the host sub-system 12.

Referring now to FIG. 2, a sample screen produced by the program of the invention is shown. The screen 32 may be filled with text and/or illustrations. The text may include instructions or present a question to the operator or user to illicit a response from the user. In the picture displayed on the screen, there are a number of buttons 34 having a selected microscript code 36 associated therewith. Any graphical element in a picture can be activated by attaching a microscript code 36 to it. A button may be an illustration 33, a box 35, shape 37, or any combination of graphic elements as shown in FIG. 2. For example, the button 34 on screen 32 designates a laser disc demonstration function. If the user clicks on the button 34 the command function associated with the microscript code 36 will be executed. The user clicks on a button by manipulating a mouse to position a pointer on the button and then pressing the mouse button to execute the microscript code. Touch screens or track balls may also be used. This hardware is commonly available and functions in a known manner. The microscript code 36 for example, may include a command to print what is shown on the screen 32 or to call up another screen. Screen 32 is typical of all of the screens or pictures formed by the computer program of the invention. A course produced by the invention typically consists of several hundred screens or pictures stored in the memory of the graphic sub-system 14 and on the drive 18. Each picture is created by the author of a specific course using a standard set of commands. New commands, however, may be created by the author.

In operation, the first picture or screen 32 of a course is called up automatically when the course is started. Every course of the invention is controlled by a standard, common, operating system which for the sake of convenience herein is referred to as the projector. The projector is a component of the application program 13. The projector will "play" any course, just as a movie projector would show any movie loaded into it. When the user makes a selection by clicking a menu item button located on the initial picture, the projector is triggered and it reads from the initial picture, the microscript code that is located in a standard location under each selectable menu item. The projector then interprets the instructions of the microscript code and executes them. For a training course, the microscript codes typically instruct the projector to call out another picture or manipulate the present picture. Any picture may have hundreds of microscript codes embedded into it. The invention of the present disclosure uses the interpreted method of executing the distributed "program" that is embedded into the numerous pictures or screens, as opposed to the more universal "compiled" program. Typically, a computer program that is interpreted runs slower than a compiled program. Prior art courses, if interpreted rather than compiled, do not perform fast enough to deliver a practical course due to the extensive number of program calculations that must be performed to monitor and control the use of the course and present the next picture. The present invention does not suffer from this limitation. Since the same action is performed each time, the projector interprets a microscript code, this action is speed optimized such that a course developed using the invention of the present disclosure is as responsive as a typical compiled course without the necessity of being stored in the unalterable compiled form. This is accomplished by the total isolation of each picture displayed on the screen 32 from any other picture stored in the program.

A course is built or created by an author one picture at a time. Each picture takes the user through a step or a level in the course or data base. Since each picture is created independent of any other picture, the author has limitless options in the creation of the course. For example, while creating the picture 32, the author may find that it would be beneficial to the user to return to picture number five at this point in the course. This is easily accomplished by embedding in the microscript code 38 under the CONTINUE button 40 a command to "go to picture number five".

The user may be instructed to click on the CONTINUE button 40 so that he may continue with the course. Clicking on the PREVIOUS button 42, returns the user to the previous picture he was viewing. The RETRACE button 46 permits the user to retrace his path through the course. The microscript code 38 associated with the RETRACE button 46 is rewritten by the program as the user progresses through the course. This permits the user to retrace his path through the course at any time. The microscript code 38 of the RETRACE button 46 is automatically rewritten by the projector thus creating a new or re-written picture. The rewritten picture replaces the stored version of the original picture in the memory 26 and/or disk drive 18. By clicking on the RETRACE button 46, the user is returned to the previous picture which was accessed by him. For example, if the user advances through the program from picture number twenty to picture number forty. The microscript code of the RETRACE button 46 on picture number forty is automatically rewritten to embed a command returning the user to picture number twenty if the user clicks on the RETRACE button 46. Changing the microscript code 38 of the RETRACE button 46 does not alter or effect any of the other pictures in the program or any other textual or graphical elements in the picture forty. The change is only embedded, in the above example, on picture number forty of the course program. The ability to retrace his progress or path in a course is very valuable to the user in that it permits him to go back in a course to a point or level where he clearly understands the course. That is, if the user has followed a path or branch in the course leading it to an inaccurate or unacceptable solution, he may return to the point in the course where his answers where correct and then advance through the course again along the correct or accurate path. This is an extremely valuable tool in that it permits a user to learn from his mistakes by permitting him to retrace the path he followed through the course and then thereby determine his mistakes. By permitting the user to go forward through the course again, a new path may be taken by the user which again may be retraced if necessary if the new path leads to an inaccurate result. Thus, the user is permitted to explore all the possibilities of the course to arrive at the proper solution without getting lost in the course because at any time he may retrace his path and return to the beginning of the course if necessary The path tracking is accomplished automatically by the projector without requiring programming by the author creating a specific course.

While the above discussion has been directed to the automatic rewriting by the program of the microscript code 38 of the RETRACE button 46, it will be observed that any component or element of a picture may be changed when in the authoring mode or during the presentation of the course. Thus, if a program requires a revision or it is determined that the program contains errors, modifications or corrections can be made on the specific picture requiring modifications. Rewriting or retesting the entire course is not required. New pictures made be added if needed and accessed by the program in the required sequence. For example, it may be determined that at the picture twenty, the program should branch along a different path. If the original program comprised two hundred pictures, additional pictures 201 through 210 may be required to create the alternate branch of the program. The pictures 201 through 210 are created. However, it is desired that these pictures be accessed by the program by a choice made on picture number twenty. This is readily accomplished by accessing the picture number twenty and inserting or embedding a button with microscripts on to picture number twenty which when clicked upon by the user will call up picture 201 and the user may then proceed through the newly created branch of the program comprising pictures 201 through 210. The isolation of each picture permits this type of versatility in creating a program according to the present disclosure which is not possible with a traditional compiled program.

Figure 3:
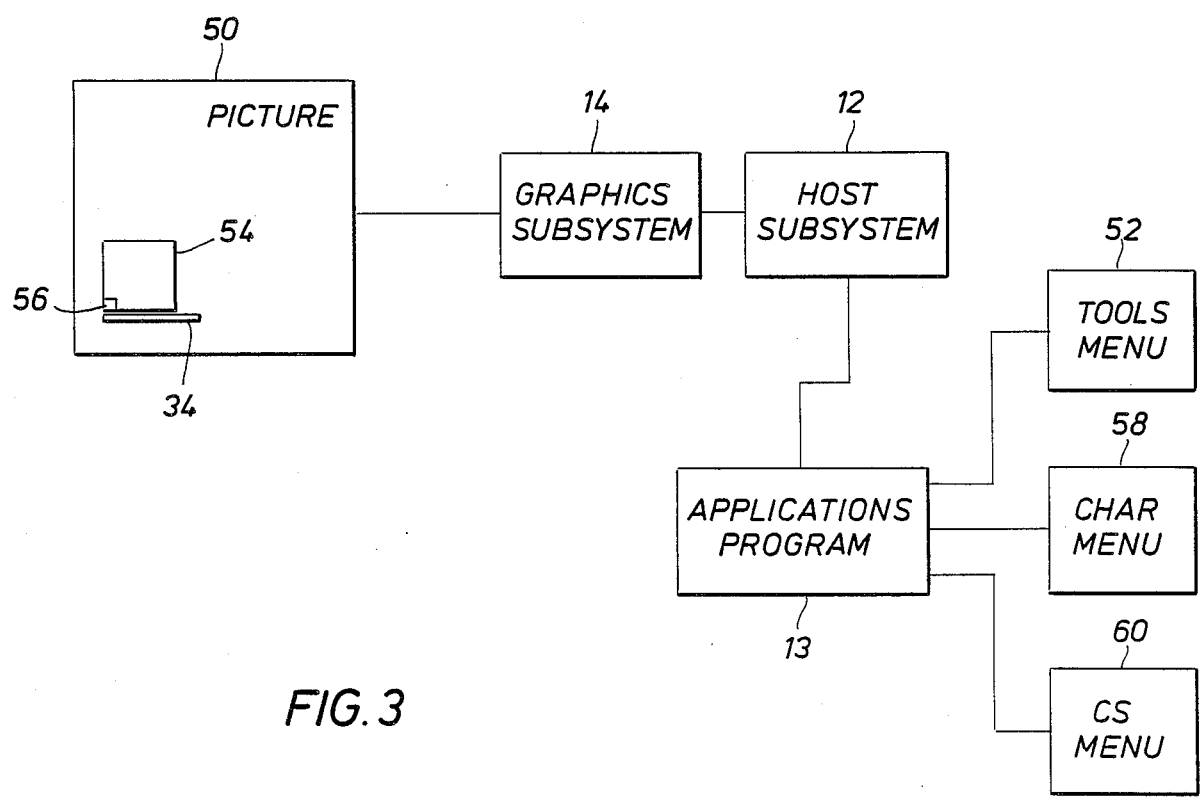
FIG. 3 is a general flowchart of an exemplary computer process employing the method of the invention.

Referring now to FIG. 3, creation of a picture of the course of the invention will be described. The picture 50 described hereinafter is illustrative of the pictures which may be created utilizing the invention of the present disclosure. To begin with, the picture 50 shown on the monitor 24 of the graphics sub-system 14 is blank. The author views the menu screens of the applications program 13 on the monitor 20 of the host sub-system 12. Initially, the author selects the "Symbol-Paint" command from the tools enu 52 which appears on the monitor 20 of the host sub-system 12. The SymbolPaint command is used to create a specially shaped button 54 on the picture 50, if an existing button is not suitable. If a suitable button exists, that button may be copied and placed on the picture 50. The button 54 includes a definition point 56 that serves as the reference location for attachment of a microscript 34. The button 54 is placed on the picture 50 using the "Get Symbol" command from the CHAR or character menu 58 of the applications program 13. The button 54 may be moved around and positioned anywhere on the picture 50 by selecting the "Move" command from the CHAR menu 58 of the applications program 13. Next, the author places the cursor or pointer of the graphics sub-system 14 on the button 54 using the mouse or track ball of the input device 22 of the host sub-system 12. To add the microscript to the button 54, the author selects the "MicroScript" command from the CHAR menu 58. This command locates the definition point for the button 54 and places the cursor at the standard microscript location one point below the definition point. The "MicroScript" command then select s a special font in a pre-selected color for the microscript.

The "MicroScript" command or commands are typed in by the author from the keyboard 22 of the host sub-system 12. A library of standard commands whose function is known to the projector of the system is available to the author for use. The commands appear on the picture 50 in a human readable form of small upper case letters, numbers, and punctuation. In this form the command sequence can be modified and edited with standard word processing tools. To convert the "MicroScript" commands to a form readable in the play-back mode of the projector function of the applications program 13, the cursor is placed on the button 54 and then the "Transcriber" command is selected from the CS menu 60 of the applications program IS. The CS menu 60 includes special authoring functions for use by the author. Selection of the "Transcriber" command causes the human readable font of the "MicroScript" command to be converted to a special, very small font of identically appearing hash marks. The human readable font of the "MicroScript" command is cleared from the screen. Although, in this form, the microscript characters appear to the human eye to be graphically identical, they do retain the intelligence placed in them by the author. The "MicroScript" commands can be rendered completely invisible, if desired, by matching the color of the special hash mark characters with the background color of the picture This is an option with the author, since the final microscripts are not obtrusive, appearing only as accent shadows on the final presentation of the picture 50 and therefore can be left visible.

Any "MicroScript" command may be changed to its human readable form, identified by reference numeral 39 in FIG. 2, at any time during playback or authoring of the course by placing the cursor on the button and again selecting the "Transcriber" command from the CS menu 60 of the applications program 13. The "Transcriber" function is "smart" and determines which form the microscript is in and converts it to the other form.

The button 54, now complete, can be moved with its microscript to any other place on the picture 50, on the graphics sub-system 14, or copied and placed on any number of other pictures. It is a self-contained entity that survives and functions without reference to any absolute location on any screen or picture. The picture 50, with its button 54 is saved to disk on the host sub-system 12 as one ASCII coded file. The picture 50 and its button 54 with the microscript can be reconstructed by the projector without reference to any other picture. The button 54 with its microscript is not saved as a distinct entity. It is only saved as an integral element of the picture 50. If the button 54 was duplicated and used in another picture it would be saved again as part of that picture when that other picture is stored to the disk. When the applications program 13 is being presented to the user, the projector is placed in the "Play Back" mode and reads the microscript attached to the button selected by the user and interprets the command.

While the foregoing is directed to the preferred embodiments of the present invention, other and further embodiments of the invention may be devised without departing from the basic scope thereof, and the scope thereof is determined by the claims which follow.

What is claimed is:

1. An interactive computer software system permitting a user to take a pre-selected computer course or access a pictorial data base, comprising:

(a) a host computer sub-system including CPU means for executing computer programs, means for entering the data into the system, and display means for displaying the input data;

(b) means for loading said pre-selected computer course in said host computer sub-system;

(c) a graphics computer sub-system operatively connected to said host computer sub-system, said graphics computer sub-system executing said course upon interrogation by said host computer sub-system wherein said course includes a series of interrelated pictures displayed by said graphics computer sub-system, said series of pictures defining a course responsive to input data from the user and interactively dialoguing with the user as the user progresses through said pre-selected course or data base; and (d) wherein said pre-selected computer course comprises a distributed program embedded in said series of interrelated pictures.

2. The system of claim 1 wherein said series of pictures are stored in said graphics computer sub-system and displayed on a monitor connected to said graphics computer sub-system upon execution by said host computer sub-system of commands embedded in said series of pictures.

3. The system of claim 1 wherein said series of pictures include at least one button thereon having an associated microscript code.

4. The system of claim 3 wherein said series of pictures include at least one button common to all pictures.

5. The system of claim 4 wherein said common button defines a CONTINUE function.

6. The system of claim 4 wherein said common button defines a PREVIOUS function.

7. The system of claim 4 wherein said common button defines a RETRACE function.

8. The system of claim 7 wherein said course program automatically rewrites the RETRACE microscript code as a user progresses through the training course.

9. The system of claim 1 wherein said series of pictures are independent and isolated from each other.

10. The system of claim 9 wherein alteration of a picture does not affect any other picture in the program.

11. An interactive software system permitting a user to take a pre-selected computer course or access a data base, comprising:
   (a) a host computer sub-system including CPU means for executing computer programs, means for entering the data into the system, and display means for displaying the input data;
   (b) means for loading said pre-selected computer course in said host computer sub-system;
   (c) a graphics computer sub-system operatively connected to said host computer sub-system, said graphics computer sub-system executing said course upon interrogation by said host computer sub-system wherein said course includes a series of interrelated screens displayed by said graphics computer sub-system, said series of screens defining a course responsive to input data from the user and interactively dialoguing with the user as the user progresses through the said preselected course or data base; and
   (d) wherein control commands for executing said course are embedded in said series of interrelated screens, said control commands being alterable for modifying a command function on any of said series of interrelated screens.

12. The system of claim 11 wherein said control commands are displayed on said series of screens in microscript code and comprise a visible element of said series of screens.

13. The system of claim 11 wherein said control commands displayed on said series of screens comprise a microscript code on said series of screens which is invisible to the user.

14. In a method permitting a user to take a preselected computer course or access a pictorial data base including a computer system having a host computer sub-system including CPU means for executing computer programs, means for entering the data into the system, and display means for displaying the input data, the steps comprising:
   (a) loading and running an applications program, said applications program including a preselected computer course;
   (b) storing a series of interrelated pictures which define the preselected computer course; and
   (c) storing executable commands of the preselected computer course embedded on the series of interrelated pictures wherein said pictures are independent and isolated from each other.

15. The method of claim 14 wherein said command functions are stored on the series of interrelated pictures in alterable microscript code.

* * * * *